United States Patent
Chien et al.

(10) Patent No.: US 9,252,882 B2
(45) Date of Patent: Feb. 2, 2016

(54) OPTICAL FIBER MODULE

(71) Applicant: EZCONN CORPORATION, Taipei (TW)

(72) Inventors: Tso Han Chien, Taipei (TW); Shih Chieh Kang, Taipei (TW)

(73) Assignee: EZCONN CORPORATION, Taipei (TW)

( * ) Notice: Subject to any disclaimer, the term of this patent is extended or adjusted under 35 U.S.C. 154(b) by 76 days.

(21) Appl. No.: 13/935,581

(22) Filed: Jul. 5, 2013

(65) Prior Publication Data

US 2015/0010310 A1    Jan. 8, 2015

(51) Int. Cl.
*H04B 10/00* (2013.01)
*H04B 10/40* (2013.01)
*G02B 6/42* (2006.01)

(52) U.S. Cl.
CPC .............. *H04B 10/40* (2013.01); *G02B 6/4277* (2013.01); *G02B 6/4292* (2013.01)

(58) Field of Classification Search
USPC ................................................. 398/116, 135
See application file for complete search history.

(56) References Cited

U.S. PATENT DOCUMENTS

| | | | |
|---|---|---|---|
| 8,831,432 B2 * | 9/2014 | Tang et al. | 398/138 |
| 2004/0197101 A1 * | 10/2004 | Sasser et al. | 398/117 |
| 2005/0259994 A1 * | 11/2005 | Zhang et al. | 398/164 |
| 2006/0216040 A1 * | 9/2006 | Nelson | 398/186 |
| 2009/0175627 A1 * | 7/2009 | Yu | 398/141 |
| 2009/0269077 A1 * | 10/2009 | Sone et al. | 398/135 |
| 2009/0279253 A1 * | 11/2009 | Musciano et al. | 361/692 |
| 2009/0279889 A1 * | 11/2009 | Kirkpatrick et al. | 398/41 |
| 2010/0028015 A1 * | 2/2010 | Hosking | 398/135 |
| 2010/0054734 A1 * | 3/2010 | Hosking | 398/25 |
| 2010/0054749 A1 * | 3/2010 | Hosking | 398/135 |
| 2010/0111476 A1 * | 5/2010 | Shirk et al. | 385/53 |
| 2010/0135620 A1 * | 6/2010 | Chou | 385/88 |
| 2010/0178061 A1 * | 7/2010 | Tawa et al. | 398/139 |
| 2011/0091207 A1 * | 4/2011 | Xie et al. | 398/38 |
| 2011/0221601 A1 * | 9/2011 | Aguren | 340/653 |
| 2012/0114339 A1 * | 5/2012 | Yu | 398/182 |
| 2012/0141132 A1 * | 6/2012 | Walker | 398/116 |
| 2012/0195601 A1 * | 8/2012 | Gambini et al. | 398/200 |
| 2012/0301152 A1 * | 11/2012 | Edwards et al. | 398/135 |
| 2013/0039662 A1 * | 2/2013 | Brooks et al. | 398/91 |
| 2013/0077968 A1 * | 3/2013 | Yang | 398/45 |

(Continued)

OTHER PUBLICATIONS

W-Optics, Bidirectional Optical Transceivers Compact Small Form Factor Pluggable 2 Channel with LC Receptacle, CSFP 2Channel 1000Base Optical Transceivers, Model Name: S2x-xAxx-211, Feb. 14, 2012.*

W-Optics, Bidirectional Optical Transceivers Compact Small Form Factor Pluggable 2 Channel with LC Receptacle, CSFP 2Channel 1000Base Optical Transceivers, Model Name: S2x-xAxx-211, Feb. 14, 2012, www.w-optics.com/S2x-xAxx-211_CompactSFP%201.25G_V02.pdf.*

*Primary Examiner* — David Payne
*Assistant Examiner* — Pranesh Barua
(74) *Attorney, Agent, or Firm* — Min-Lee Teng; Litron Patent & Trademark Office

(57) ABSTRACT

An optical fiber module includes: a casing; a first optical fiber having a portion in the casing; a first optical transmitter in the casing, wherein the first optical transmitter is configured to emit a first optical signal to the first optical fiber; a second optical fiber having a portion in the casing, wherein optical signals transmitted through the second optical fiber are independent from those transmitted through the first optical fiber; and a first optical receiver in the casing, wherein the first optical receiver is configured to receive a second optical signal from the second optical fiber.

20 Claims, 11 Drawing Sheets

(56) References Cited

U.S. PATENT DOCUMENTS

2013/0148977 A1* 6/2013 Shah et al. .................... 398/135
2013/0223484 A1* 8/2013 Tang et al. .................... 375/219
2014/0097790 A1* 4/2014 Yeh .............................. 320/108

* cited by examiner

OPTICAL FIBER MODULE

BACKGROUND OF THE DISCLOSURE

1. Field of the Disclosure

The disclosure relates to an optical fiber module, and more particularly, to an optical fiber module with multiple channels for data transmission and reception.

2. Brief Description of the Related Art

Typically, optical sub-assembly for a transceiver can be classified into transmitting optical sub-assembly (TOSA) for transmitting optical signals, receiving optical sub-assembly (ROSA) for receiving optical signals, bi-directional optical sub-assembly (BOSA) composed of TOSA and ROSA for transmitting and receiving optical signals in the same optical fiber that can transmit bi-directional optical signals and tri-directional optical sub-assembly (TRI-DI OSA) composed of TOSA and ROSA for transmitting and receiving optical signals in the same optical fiber that can transmit tri-directional optical signals. An optical fiber module may include the TOSA, ROSA, BOSA of TRI-DI OSA for converting electronic signals into optical signals and/or converting optical signals into electronic signals and an optical fiber coupler for coupling optical signals from TOSA, BOSA or TRI-DI OSA to an optical fiber and/or coupling optical signals from an optical fiber to ROSA, BOSA or TRI-DI OSA.

SUMMARY OF THE DISCLOSURE

The present invention provides an optical fiber module for data transmission in multiple independent channels. The optical fiber module may comprise: a casing; a first optical fiber having a portion in the casing; a first optical transmitter in the casing, wherein the first optical transmitter is configured to emit a first optical signal to the first optical fiber; a second optical fiber having a portion in the casing, wherein optical signals transmitted through the second optical fiber are independent from those transmitted through the first optical fiber; and a first optical receiver in the casing, wherein the first optical receiver is configured to receive a second optical signal from the second optical fiber.

In an example of the present invention, the optical fiber module may further comprise multiple first contacts aligned in a first line and configured for external connection of the optical fiber module and multiple second contacts aligned in a second line and misaligned with the first line, wherein the second contacts are configured for external connection of the optical fiber module, wherein the first optical transmitter is configured to emit the first optical signal to the first optical fiber based on data transmitted through a first one of the first and second contacts, wherein a second one of the first and second contacts is configured to transmit data based on the second optical signal.

In an example of the present invention, a third one of the first and second contacts may be configured to transmit information of indicating whether a light is emitted from the first optical transmitter, to transmit information of indicating whether a light is transmitted from the second optical fiber to the first optical receiver, to transmit information of controlling whether the data transmitted through the first one of the first and second contacts loop back to a fourth one of the first and second contacts, to be electrically grounded, to transmit analog information generated by an analog indicator of the optical fiber module, to transmit information of indicating whether a temperature in the optical fiber module is abnormal, or to transmit information of indicating whether a voltage applied in the optical fiber module is abnormal.

In an example of the present invention, the optical fiber module may further comprise a circuit board in the casing, wherein the first optical transmitter is configured to emit the first optical signal to the first optical fiber based on data from the circuit board, wherein the circuit board is configured to transmit data based on the second optical signal.

In an example of the present invention, the optical fiber module may further comprise a flexible circuit film electrically connecting the first optical transmitter to the circuit board.

In an example of the present invention, the optical fiber module may further comprise a flexible circuit film electrically connecting the first optical receiver to the circuit board.

In an example of the present invention, the optical fiber module may further comprise multiple first pins aligned in a first line and configured for external connection of the optical fiber module and multiple second pins aligned in a second line and misaligned with the first line, wherein the second pins are configured for external connection of the optical fiber module, wherein the first optical transmitter is configured to emit the first optical signal to the first optical fiber based on data transmitted through a first one of the first and second pins, wherein a second one of the first and second pins is configured to transmit data based on the second optical signal, wherein the first optical transmitter and receiver are over the circuit board and the first and second pins are under the circuit board.

In an example of the present invention, the optical fiber module may further comprise multiple first pins aligned in a first line and configured for external connection of the optical fiber module and multiple second pins aligned in a second line and misaligned with the first line, wherein the second pins are configured for external connection of the optical fiber module, wherein the first optical transmitter is configured to emit the first optical signal to the first optical fiber based on data transmitted through a first one of the first and second pins, wherein a second one of the first and second pins is configured to transmit data based on the second optical signal, wherein the first optical transmitter and receiver and the first and second pins are under the circuit board.

In an example of the present invention, the optical fiber module may further comprise multiple first pins aligned in a first line and configured for external connection of the optical fiber module, multiple second pins aligned in a second line and misaligned with the first line and a flexible circuit film connecting the first optical receiver to the circuit board across over the first optical transmitter, wherein the second pins are configured for external connection of the optical fiber module, wherein the first optical transmitter is configured to emit the first optical signal to the first optical fiber based on data transmitted through a first one of the first and second pins, wherein a second one of the first and second pins is configured to transmit data based on the second optical signal, wherein the first and second pins are under the circuit board.

In an example of the present invention, the optical fiber module may further comprise a second optical receiver in the casing, wherein the second optical receiver is configured to receive a third optical signal from the first optical fiber, a second optical transmitter in the casing, wherein the second optical transmitter is configured to emit a fourth optical signal to the second optical fiber, a first filter in an optical path between the first optical fiber and the first optical transmitter and in an optical path between the first optical fiber and the second optical receiver and a second filter in an optical path between the second optical fiber and the first optical receiver and in an optical path between the second optical fiber and the second optical transmitter.

In an example of the present invention, the optical fiber module may further comprise a first ferrule in the casing, wherein an internal passageway in the first ferrule receives the portion of the first optical fiber, and a second ferrule in the casing, wherein an internal passageway in the second ferrule receives the portion of the second optical fiber. The first optical fiber may extend from the internal of the casing to the external of the casing. The second optical fiber may extend from the internal of the casing to the external of the casing.

In example of the present invention, the portion of the first optical fiber may extend in a first direction and the portion of the second optical fiber may extend in a second direction, wherein the first ferrule may have a first surface inclined from a first edge of the first ferrule to a second edge of the first ferrule opposite to the first edge of the first ferrule with respect to the first direction, wherein the first optical fiber may have a second surface, at a terminal end of the first optical fiber, substantially coplanar with the first surface of the first ferrule, wherein the second ferrule may have a third surface inclined from a first edge of the second ferrule to a second edge of the second ferrule opposite to the first edge of the second ferrule with respect to the second direction, wherein the second optical fiber may have a fourth surface, at a terminal end of the second optical fiber, substantially coplanar with the third surface of the second ferrule.

These, as well as other components, steps, features, benefits, and advantages of the present disclosure, will now become clear from a review of the following detailed description of illustrative embodiments, the accompanying drawings, and the claims.

BRIEF DESCRIPTION OF THE DRAWINGS

The drawings disclose illustrative embodiments of the present disclosure. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same reference number or reference indicator appears in different drawings, it may refer to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 1:
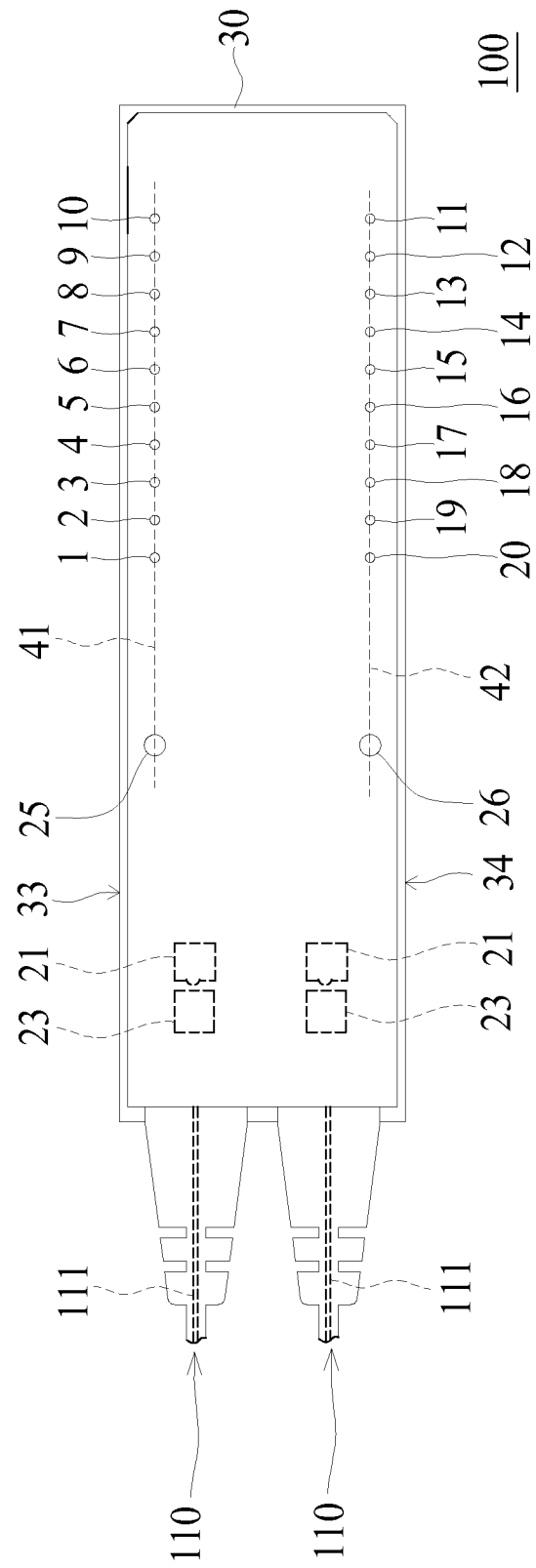
FIG. 1 shows a bottom view of a pigtail type of optical fiber module with dual-channel connection in accordance with a first embodiment of the present invention.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION OF THE INVENTION

Illustrative embodiments are now described. Other embodiments may be used in addition or instead. Details that may be apparent or unnecessary may be omitted to save space or for a more effective presentation. Conversely, some embodiments may be practiced without all of the details that are disclosed.

First Embodiment

Figure 2:
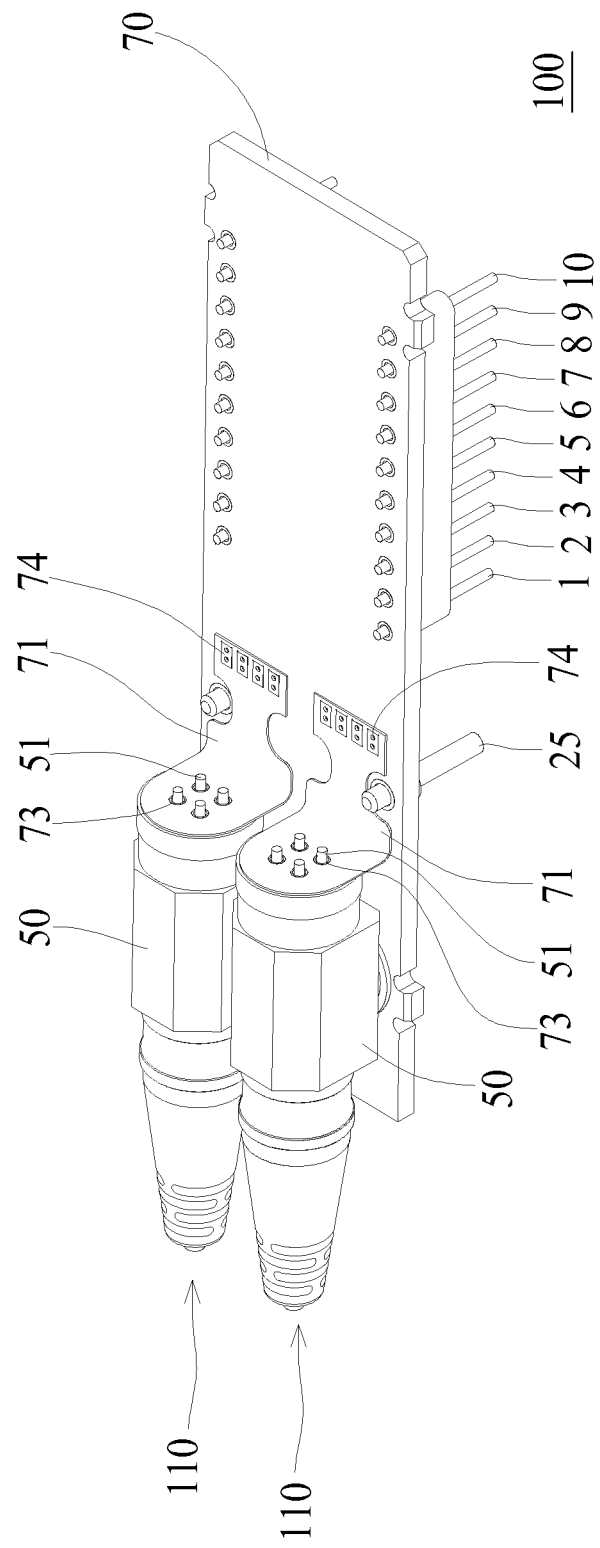
FIG. 2 is a perspective view showing a structure of a pigtail type of optical fiber module in accordance with the first embodiment of the present invention.
Figure 3:
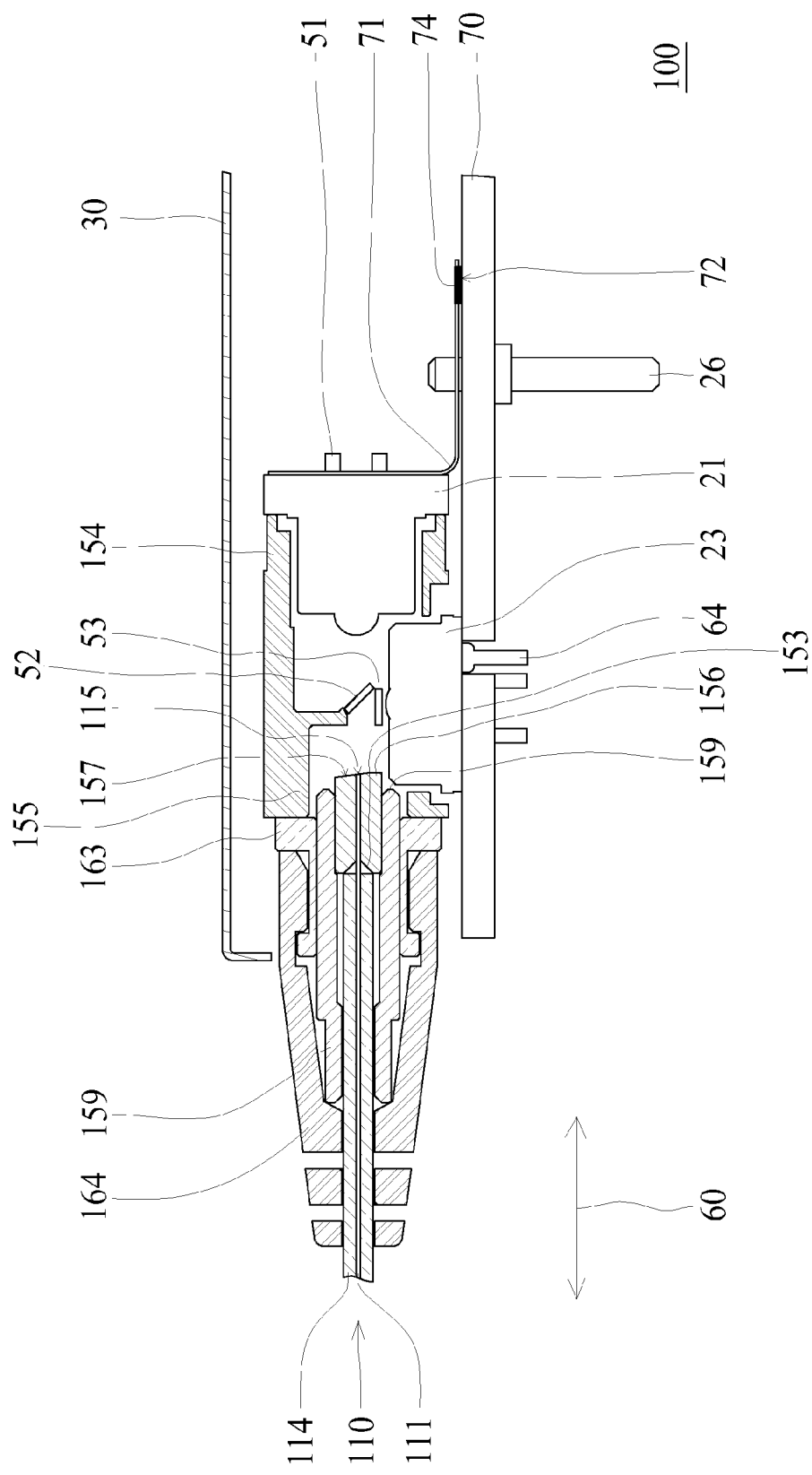
FIG. 3 is a cross-sectional view showing an internal structure of a pigtail type of optical fiber module in accordance with the first embodiment of the present invention.

FIG. 1 shows a bottom view of a pigtail type of optical fiber module with dual-channel connection in accordance with the first embodiment of the present invention. FIG. 2 is a perspective view showing a structure of a pigtail type of optical fiber module in accordance with the first embodiment of the present invention. FIG. 3 is a cross-sectional view showing an internal structure of a pigtail type of optical fiber module in accordance with the first embodiment of the present invention. Referring to FIGS. 1-3, for a pigtail type of optical fiber module 100, two independent channels 110, each composed of an optical fiber 111 for transmitting optical signals and a protection jacket 114 enclosing the optical fiber 111 for protecting the optical fiber 111, may be mechanically and optically coupled to the optical fiber module 100, wherein the optical signals transmitted through one of the optical fibers 111 may be independent from those transmitted through the other one of the optical fibers 111.

Referring to FIGS. 1-3, the optical fiber module 100 may include two transmitting and receiving modules 50, having the same internal structures, arranged in parallel and in a casing 30 of the optical fiber module 100. Each of the transmitting and receiving modules 50 may include an optical receiver 23, such as photodiodes, for receiving optical signals from the external devices through one of the optical fibers 111 and converting the received optical signals into electronic signals to be transmitted to a controller or computer through some of pins or electrical contacts 1-20 of the optical fiber module 100. Further, the optical fiber module 100 may receive electronic signals from the controller or computer through some of the pins or contacts 1-20 and each of the transmitting and receiving modules 50 may include an optical transmitter 21, i.e. light source, such as laser emitter or laser diode (LD), for converting the received electronic signals into optical signals to be transmitted to the external devices through one of the optical fibers 111.

Referring to FIGS. 1-3, the optical fiber module 100 may include a circuit board 70, such as printed circuit board or ceramic circuit board, having the optical transmitting and receiving modules 50 mounted thereon, that is, the optical transmitters 21 and receivers 23 may be arranged over the top surface of the circuit board 70. The pins or contacts 1-20, 25 and 26 extending downwards from a bottom surface of the circuit board 70 may pass through holes in the circuit board 70 and joins the circuit board 70. The optical transmitters 21 may be configured to emit optical signals to the optical fibers 111 respectively based on data from the circuit board 70. Further, the circuit board 70 may be configured to transmit data based on optical signals received by the optical receivers 23 from the optical fibers 111 respectively.

Referring to FIGS. 1-3, the optical fiber module 100 may include two flexible circuit films 71 over the circuit board 70 and in the casing 30 for electrically coupling the circuit board 70 to the optical transmitters 21 respectively. The flexible circuit films 71 perform the same function and have the same structure for connection, and for brief description, one of the flexible circuit films 71 is illustrated as below. The flexible circuit film 71 may couple corresponding electrical pins 51, arranged in a vertical plane, at a back side of the corresponding optical transmitter 21 to corresponding electrical contacts 72, arranged in a horizontal plane, of the circuit board 70, wherein the electrical contacts 72 are at a top side of the circuit board 270. The corresponding electrical pins 51 may pass through holes in the flexible circuit film 71 and joins ring-shaped electrical contacts 73 of the flexible circuit film 71 by tin or a solder, such as a tin-lead alloy. The flexible circuit film 71 may have electrical contacts 74 joining the corresponding electrical contacts 72 of the circuit board 70 by tin or a solder, such as a tin-lead alloy. Accordingly, electronic signals or data streams may be transmitted from the circuit board 70 to the corresponding optical transmitter 21 through the flexible circuit film 71.

Referring to FIGS. 1-3, electrical pins 64 at a bottom side of the corresponding optical receiver 23 may pass through holes in the circuit board 70 and joins the circuit board 70 by tin or a solder, such as a tin-lead alloy, so as to electrically and mechanically couple the corresponding optical receiver 23 to the circuit board 70.

Referring to FIGS. 1-3, the transmitting and receiving modules 50 perform the same function and have the same internal structure for optically coupling, and for brief description, one of the transmitting and receiving modules 50 is illustrated as below.

Referring to FIGS. 1-3, the transmitting and receiving module 50 may include an optical filter 52 in the casing 30 and in optical paths between the corresponding optical fiber 111 and the corresponding optical transmitter 21 and between the corresponding optical fiber 111 and the corresponding optical receiver 23. Lights with first specific wavelengths from the corresponding optical transmitter 21 may be configured to pass the optical filter 52 to the corresponding optical fiber 111. The optical filter 52 may be configured to reflect lights with second specific wavelengths from the corresponding optical fiber 111 to the corresponding optical receiver 23. For the pigtail type of optical fiber module 100, the corresponding optical fiber 111 extending from the optical fiber module 100 to the external devices may be optically coupled to the corresponding optical transmitter 21 and receiver 23 not through any optical fiber, that is, directly optically coupled to the optical filter 52.

Referring to FIGS. 1-3, the transmitting and receiving module 50 may include an optical filter 53 in the casing 30 and in an optical path between the optical filter 52 and the corresponding optical receiver 23. Lights with third specific wavelengths, within the second ones, from the optical filter 52 may be configured to pass the optical filter 53 to the corresponding optical receiver 23.

Referring to FIGS. 1-3, the transmitting and receiving module 50 may include a fixture 154, in the casing 30, configured to fix with the corresponding optical transmitter 21, the corresponding optical receiver 23 and the filters 52 and 53. The corresponding optical transmitter 21 may be at a back side of the fixture 154 and face forward to emit lights to the corresponding optical fiber 111 through the optical filter 52. The corresponding optical receiver 23 may be at a bottom side of the fixture 154 and face upward to receive lights from the corresponding optical fiber 111 via reflection of the optical filter 52. An opening 155 at a front end of the fixture 154 may have the corresponding optical fiber 111 pass therethrough to directly optically couple with the optical filter 52.

Referring to FIGS. 1-3, the transmitting and receiving module 50 may include a ferrule 156, i.e. fiber support, shaped like a cylinder configured to receive a naked portion of the corresponding optical fiber 111, not covered by the corresponding protection jacket 114. An internal passageway at a longitudinal axis of the ferrule 156 passes through the ferrule 156 and accommodates the naked portion. The ferrule 156 supports the naked portion extending in an axial direction 60 and passes through the opening 155. The ferrule 156 has a surface 157 inclined from an upper edge of the ferrule 156 to a bottom edge of the ferrule 156 opposite to the upper edge of the ferrule 156 with respect to the axial direction 60, wherein an acute angle, ranging from 60 degrees to 90 degrees for example, may exist between the inclined surface 157 and the longitudinal axis of the ferrule 156. The naked portion of the corresponding optical fiber 111 may have a surface 115, at a terminal end of the naked portion, substantially coplanar with the surface 157 of the ferrule 156. Lights passing through the naked portion may emerge from the surface 115 of the naked portion to the corresponding optical receiver 23; lights passing from the corresponding optical transmitter 21 may be incident to the surface 115 of the naked portion. The ferrule 156 includes a guide sink 153 at an end thereof close to the protection jacket 114 so as to accommodate a curvature of the naked portion close to the protection jacket 114.

Referring to FIGS. 1-3, the transmitting and receiving module 50 may include a sleeve 159 surrounding the periphery of the ferrule 156. A hole in the sleeve 159 may extend along a longitudinal axis of the sleeve 59 and in the axial direction 60 and accommodate a portion of the ferrule 156, a clothed portion of the corresponding optical fiber 111 covered by the corresponding protection jacket 114 and the naked portion of the corresponding optical fiber 111 not covered by the corresponding protection jacket 114. The sleeve 159 may have an inner wall abutting against the outer wall of the ferrule 156 and confine movement of the corresponding channel 110 in directions vertical to the axial direction 60.

Referring to FIGS. 1-3, the transmitting and receiving module 50 may include a ring 163 surrounding the periphery of the sleeve 159 and having a back end joining a front end of the fixture 154 by laser welding. A hole in the ring 163 may extend along a longitudinal axis of the ring 163 and in the axial direction 60 and accommodate a portion of the sleeve 159, a portion of the ferrule 156 and the clothed and naked portions of the corresponding optical fiber 111. The ring 163 may have an inner wall abutting against an outer wall of the sleeve 159.

Referring to FIGS. 1-3, the transmitting and receiving module 50 may include a shield 164 surrounding the periphery of the ring 163, the periphery of the sleeve 159 and the periphery of the clothed portion of the corresponding optical fiber 111. The shield 164 may include a locking portion at a back side thereof and around an inner wall thereof configured to be locked with a locking portion of the ring 163 at a front side thereof and around an outer wall thereof. The shield 164 may confine movement of the corresponding channel 110 in directions vertical to the axial direction 60.

Pin Function

Referring to FIGS. 1-3, the pins or contacts 1-20 of the optical fiber module 100 are arranged at a bottom side of the optical fiber module 100. The pins or contacts 1-10 are aligned in a first line 41, configured for external electrical connection of the optical fiber module 100, and the pins or contacts 11-20 are aligned in a second line 42, configured for external electrical connection of the optical fiber module 100, wherein the first line 41 is parallel with the second line 42 and two opposite longitudinal edges 33 and 34 of the casing 30, wherein the second line 42 is misaligned with the first line 41. The distance between the first line 41 and the longitudinal edge 33 may be greater than that between the first and second lines 41 and 42 and substantially equal to that between the second line 42 and the longitudinal edge 34. Each neighboring two of the pins or contacts 1-10 may be separate from each other by substantially the same spacing; each neighboring two of the pins or contacts 11-20 may be separate from each other by substantially the same spacing that may be substantially equal to that between each neighboring two of the pins or contacts 1-10.

Referring to FIGS. 1-3, the pins or contacts 1-20 joining the circuit board 70 may pass through holes in a mother circuit board and join the mother circuit board (not shown) under the circuit board 70 by tin or a solder, such as a tin-lead alloy. The pins or contacts 1-20 may have various functions, described as below:

Referring to FIGS. 1-3, the pin or contact 2 may be an input of inverted transmitting data, i.e. electronic data stream, for a first one of the channels 110 from a protocol chip (not shown) in the controller or computer. The pin or contact 3 may be an input of non-inverted transmitting data, i.e. electronic data stream, for the first one of the channels 110 from the protocol chip. A first one of the optical transmitters 21 may emit optical signals to the optical fiber 111 of the first channel 110 based on the inverted and non-inverted transmitting data, inputting to the pins or contacts 2 and 3 respectively. The pin or contact 4 may be an input to indicate disabling the transmission from the first optical transmitter 21 to the external devices through the optical fiber 111 of the first channel 110, that is, turning off the first optical transmitter 21. For example, the transmission from the first optical transmitter 21 to the external devices through the optical fiber 111 of the first channel 110 may be disabled when a signal of logic level "one" is input to the pin or contact 4; the transmission from the first optical transmitter 21 to the external devices through the optical fiber 111 of the first channel 110 may not be disabled when a signal of logic level "zero" is input to the pin or contact 4.

Referring to FIGS. 1-3, the pin or contact 19 may be an input of inverted transmitting data, i.e. electronic data stream, for a second one of the channels 110 from the protocol chip. The pin or contact 18 may be an input of non-inverted transmitting data, i.e. electronic data stream, for the second channel 110 from the protocol chip. A second one of the optical transmitters 21 may emit optical signals to the optical fiber 111 of the second channel 110 based on the inverted and non-inverted transmitting data, inputting to the pins or contacts 19 and 18 respectively. The pin or contact 17 may be an input to indicate disabling the transmission from the second optical transmitter 22 to the external devices through the optical fiber 111 of the second channel 110, that is, turning off the second optical transmitter 21. For example, the transmission from the second optical transmitter 21 to the external devices through the optical fiber 111 of the second channel 110 may be disabled when a signal of logic level "one" is input to the pin or contact 17; the transmission from the second optical transmitter 21 to the external devices through the optical fiber 111 of the second channel 110 may not be disabled when a signal of logic level "zero" is input to the pin or contact 17.

Referring to FIGS. 1-3, the pin or contact 8 may be an output of inverted receiving data for the first channel 110 to the first protocol chip. The pin or contact 9 may be an output of non-inverted receiving data for the first channel 110 to the first protocol chip. A first one of the optical receivers 23 may receive optical signals from the optical fiber 111 of the first channel 110 and convert the received optical signals into an electronic data stream that may be inverted so as to be output from the pin or contact 8 and may be not inverted so as to be output from the pin or contact 9. The pin or contact 7 may be an output of the warning that the optical signals from the optical fiber 111 of the first channel 110 have an optical power lower than a predetermined one. For example, if the optical signals from the optical fiber 111 of the first channel 110 are detected to have an optical power lower than the predetermined one, a signal of logic level "one" may be output from the pin or contact 7. If the optical signals from the optical fiber 111 of the first channel 110 are detected not to have an optical power lower than the predetermined one, a signal of logic level "zero" may be output from the pin or contact 7.

Referring to FIGS. 1-3, the pin or contact 13 may be an output of inverted receiving data for the second channel 110 to the protocol chip. The pin or contact 12 may be an output of non-inverted receiving data for the second channel 110 to the protocol chip. A second one of the optical receivers 23 may receive optical signals from the optical fiber 121 of the second channel 110 and convert the received optical signals into an electronic data stream that may be inverted so as to be output from the pin or contact 13 and may be not inverted so as to be output from the pin or contact 12. The pin or contact 14 may be an output of the warning that the optical signals from the optical fiber 111 of the second channel 110 have an optical power lower than a predetermined one. For example, if the optical signals from the optical fiber 111 of the second channel 110 are detected to have an optical power lower than the predetermined one, a signal of logic level "one" may be output from the pin or contact 14. If the optical signals from the optical fiber 111 of the second channel 110 are detected not to have an optical power lower than the predetermined one, a signal of logic level "zero" may be output from the pin or contact 14.

Referring to FIGS. 1-3, the pin or contact 5 may be connected to a power for delivering power to the first and second optical transmitters 21 and their associated circuits. The pin or contact 6 may be connected to a power for delivering power to the first and second optical receivers 23 and their associated circuits.

Referring to FIGS. 1-3, the pin or contact 15 may be an input of clock from the controller or computer. The pin or contact 16 may be an input of data from the controller or computer. The optical fiber modulator 100 may sample the data transmitted from the pin or contact 16 based on the clock transmitted from the pin or contact 15.

Referring to FIGS. 1-3, one of the pins or contacts 1, 10 and 11 may have a first function of transmitting information of indicating whether lights are emitted from the first and second optical transmitters 21. For example, if both of the lights emitted from the first and second optical transmitters 21 are detected by two first optical detectors respectively, a signal of logic level "one" may be output from one of the pins or contacts 1, 10 and 11 to the controller or computer. If either a light is not detected to be emitted from the first optical transmitter 21 or a light is not detected to be emitted from the second optical transmitter 21, a signal of logic level "zero" may be output from said one of the pins or contacts 1, 10 and 11 to the controller or computer.

Alternatively, referring to FIGS. 1-3, one of the pins or contacts 1, 10 and 11 may have a second function of transmitting information of indicating whether lights are transmitted from the optical fibers 111 of the first and second channels 110 to the first and second optical receivers 23 respectively. For example, if both of the lights transmitted from the optical fibers 111 of the first and second channels 110 to the first and second optical receivers 23 are detected by two second optical detectors (not shown) respectively, a signal of logic level "one" may be output from one of the pins or contacts 1, 10 and 11 to the controller or computer. If either a light is not detected to be transmitted from the optical fiber 111 of the first channel 110 to the first optical receiver 23 or a light is not detected to be transmitted from the optical fiber 111 of the second channel 110 to the second optical receiver 23, a signal of logic level "zero" may be output from said one of the pins or contacts 1, 10 and 11 to the controller or computer.

Alternatively, referring to FIGS. 1-3, one of the pins or contacts 1, 10 and 11 may have a third function of transmitting information of controlling whether the inverted and non-inverted transmitting data input from the respective pins or contacts 2 and 3 loop back to the controller or computer through the respective pins or contacts 8 and 9 and the inverted and non-inverted transmitting data input from the respective pins or contacts 19 and 18 loop back to the controller or computer through the respective pins or contacts 13 and 12. For example, if a signal of logic level "one" is input to one of the pins or contacts 1, 10 and 11, the inverted and non-inverted transmitting data input from the respective pins or contacts 2 and 3 may loop back to the controller or computer through the respective pins or contacts 8 and 9 and the inverted and non-inverted transmitting data input from the respective pins or contacts 19 and 18 may loop back to the controller or computer through the respective pins or contacts 13 and 12. If a signal of logic level "zero" is input to said one of the pins or contacts 1, 10 and 11, the inverted and non-inverted transmitting data input from the respective pins or contacts 2 and 3 may not loop back to the controller or computer through the respective pins or contacts 8 and 9 and the inverted and non-inverted transmitting data input from the respective pins or contacts 19 and 18 may not loop back to the controller or computer through the respective pins or contacts 13 and 12.

Alternatively, the third function may include transmitting information of controlling whether the inverted and non-inverted transmitting data input from the respective pins or contacts 2 and 3 loop back to the controller or computer through the respective pins or contacts 13 and 12 and the inverted and non-inverted transmitting data input from the respective pins or contacts 19 and 18 loop back to the controller or computer through the respective pins or contacts 8 and 9. For example, if a signal of logic level "one" is input to one of the pins or contacts 1, 10 and 11, the inverted and non-inverted transmitting data input from the respective pins or contacts 2 and 3 may loop back to the controller or computer through the respective pins or contacts 13 and 12 and the inverted and non-inverted transmitting data input from the respective pins or contacts 19 and 18 may loop back to the controller or computer through the respective pins or contacts 8 and 9. If a signal of logic level "zero" is input to said one of the pins or contacts 1, 10 and 11, the inverted and non-inverted transmitting data input from the respective pins or contacts 2 and 3 may not loop back to the controller or computer through the respective pins or contacts 13 and 12 and the inverted and non-inverted transmitting data input from the respective pins or contacts 19 and 18 may not loop back to the controller or computer through the respective pins or contacts 8 and 9.

Alternatively, referring to FIGS. 1-3, one of the pins or contacts 1, 10 and 11 may have a fourth function of being electrically grounded such that the first and second optical transmitters and receivers 21 and 23 may have a common ground connected to said one of the pins or contacts 1, 10 and 11. Alternatively, two of the pins or contacts 1, 10 and 11 may be electrically grounded such that the first and second optical transmitters 21 may have a common ground connected to one of the pins or contacts 1, 10 and 11 and the first and second optical receivers 23 may have a common ground connected to the other one of the pins or contacts 1, 10 and 11.

Alternatively, one of the pins or contacts 1, 10 and 11 may have a fifth function of transmitting analog information generated by an analog indicator of the optical fiber module 100 to be output to the controller or computer. Alternatively, one of the pins or contacts 1, 10 and 11 may have a sixth function of transmitting information of indicating whether a temperature in the optical fiber module 100 is abnormal to be output to the controller or computer. Alternatively, one of the pins or contacts 1, 10 and 11 may have a seventh function of transmitting information of indicating whether a voltage applied in the optical fiber module 100 is abnormal to be output to the controller or computer.

The functions of pins or contacts 1, 10 and 11 may have any combination of the above first through sixth functions. For example, the combination may be that the pin or contact 1 may perform the fourth function, the pin or contact 10 may perform the first function, and the pin or contact 11 may perform the second function. The combination may be that the pin or contact 1 may perform the first function, the pin or contact 10 may perform the second function, and the pin or contact 11 may perform the third function. The combination may be that the pin or contact 1 may perform the second function, the pin or contact 10 may perform the third function, and the pin or contact 11 may perform the fourth function. The combination may be that the pin or contact 1 may perform the first function, the pin or contact 10 may perform the fourth function, and the pin or contact 11 may perform the third function. The combination may be that the pin or contact 1 may perform the fourth function, the pin or contact 10 may perform the fifth function, and the pin or contact 11 may perform the sixth function. The combination may be that the pin or contact 1 may perform the seventh function, the pin or contact 10 may perform the fifth function, and the pin or contact 11 may perform the fourth function.

Alternatively, referring to FIGS. 1-3, the optical fiber module 100 may further include two pins or contacts 25 and 26 arranged at the bottom side of the optical fiber module 100, wherein the pin or contact 25 is aligned in the first line 41, configured for external mechanical connection of the optical fiber module 100, and the pin or contact 26 is aligned in the second line 42, configured for external mechanical connection of the optical fiber module 100. Each of the pins or contacts 25 and 26 may have a transverse dimension, such as diameter, greater than that of each of the pins or contacts 1-20. The pins or contacts 25 and 26 may have a function of enhancing electromagnetic interference (EMI) performance and may be configured not to be electrically grounded.

Referring to FIGS. 1-3, in accordance with the above pigtail type of optical fiber module 100, independent optical signals or data streams may be simultaneously transmitted between the external devices and the optical fiber module 100 through the independent channels 110 independent from each other.

Second Embodiment

Figure 4:
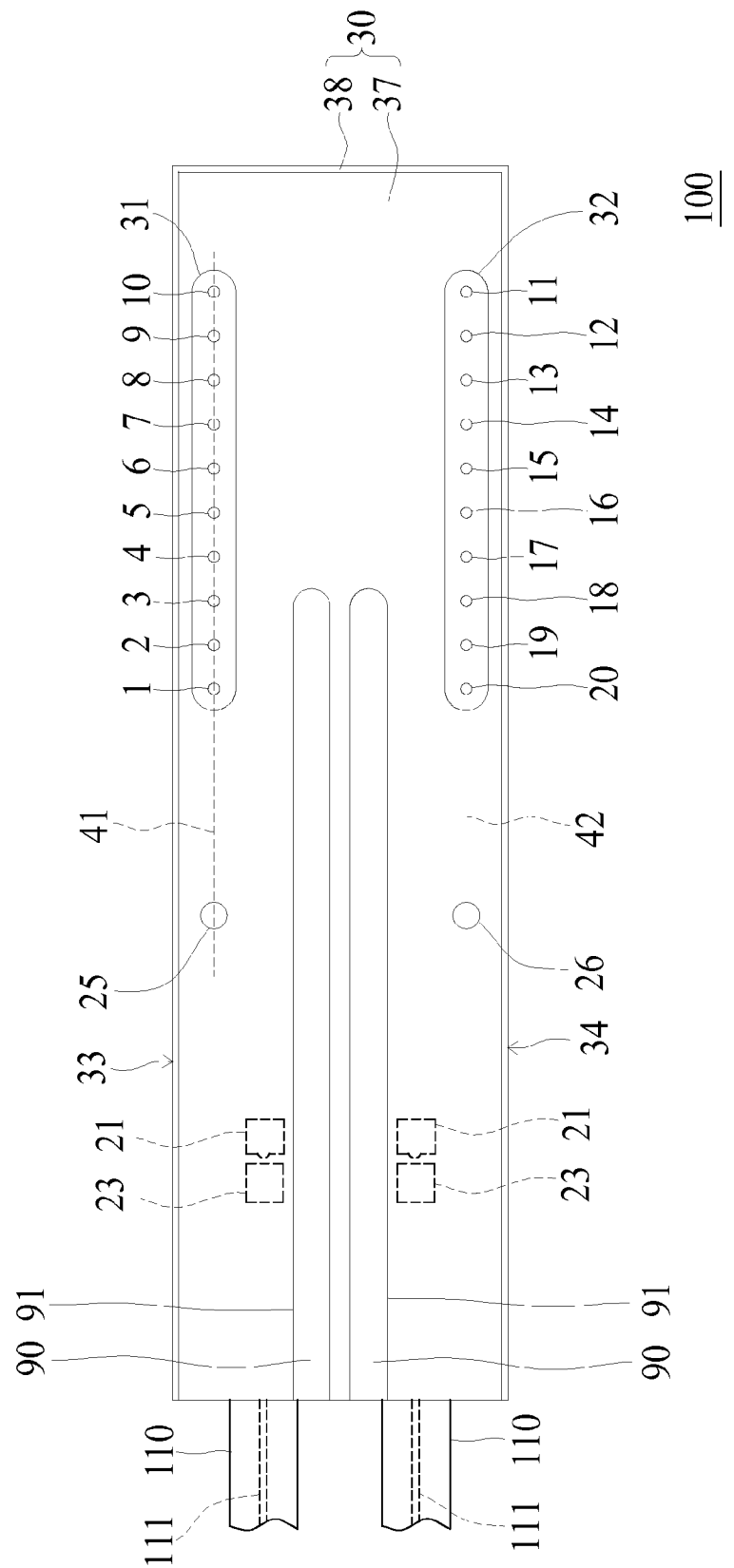
FIG. 4 shows a bottom view of a receptacle type of optical fiber module with dual-channel connection in accordance with a second embodiment of the present invention.
Figure 5:
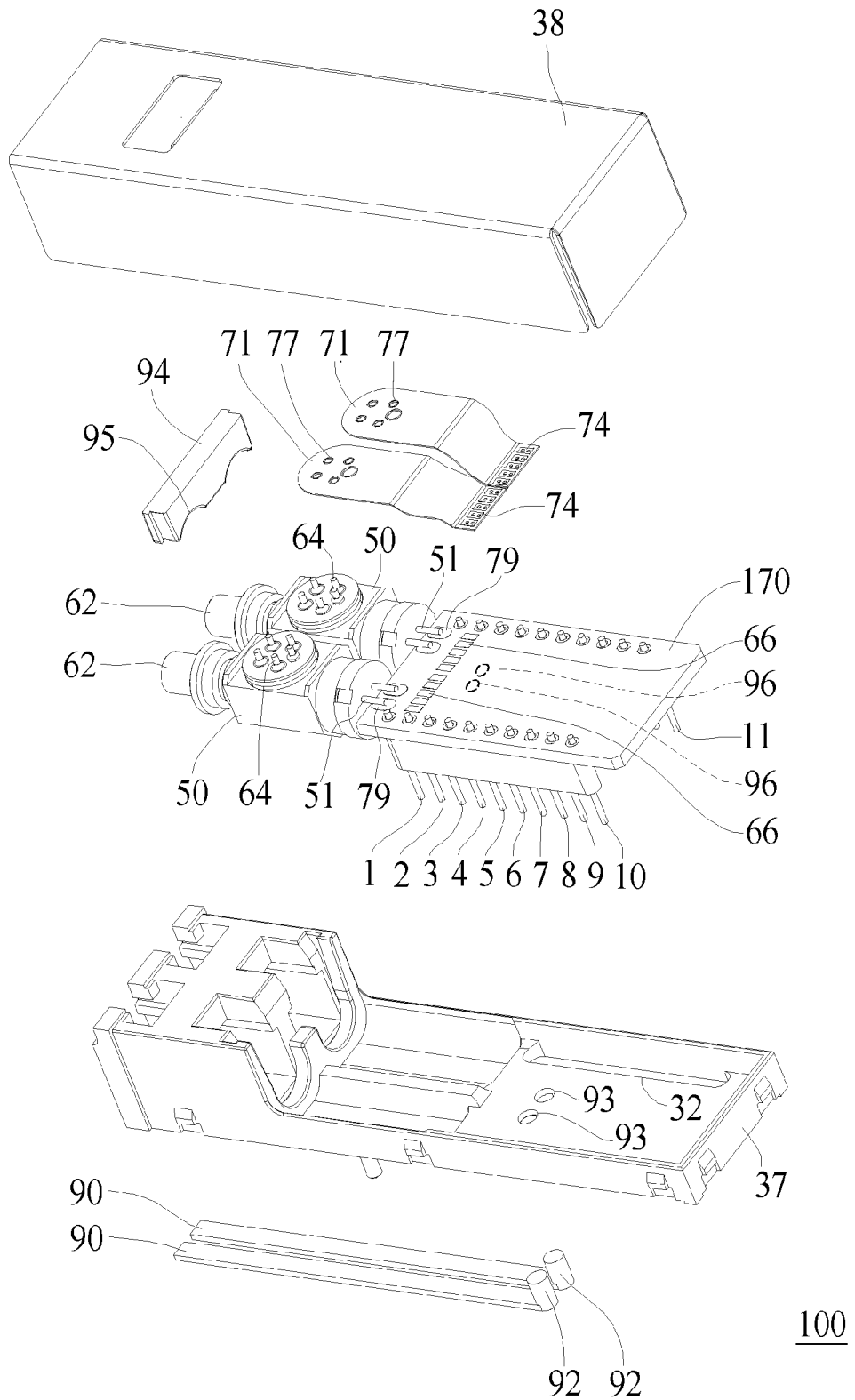
FIG. 5 is a perspective exploded view showing a structure of a receptacle type of optical fiber module in accordance with the second embodiment of the present invention.
Figure 6:
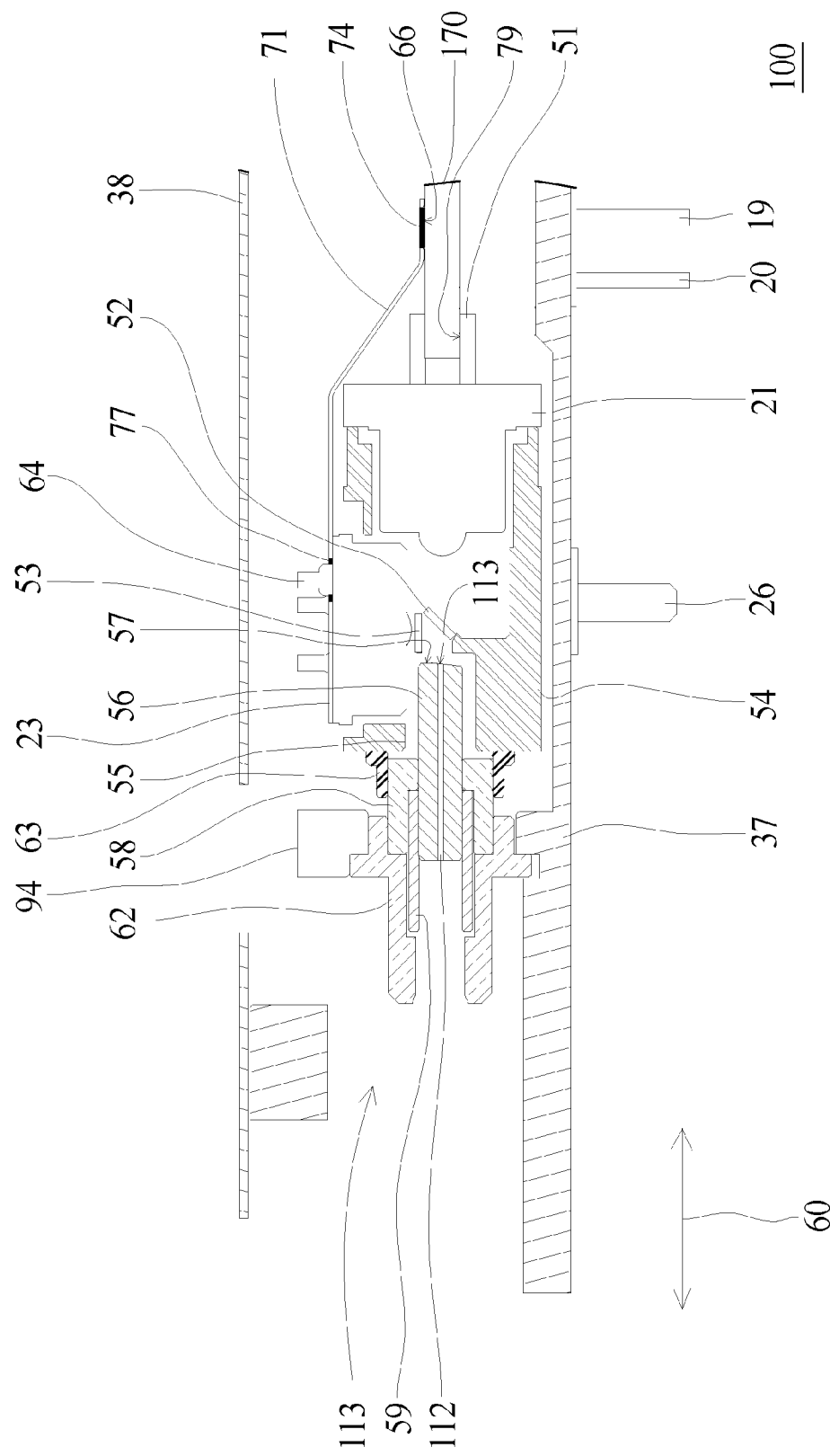
FIG. 6 is a cross-sectional view showing an internal structure of a receptacle type of optical fiber module in accordance with the second embodiment of the present invention.

FIG. 4 shows a bottom view of a receptacle type of optical fiber module with dual-channel connection in accordance with the second embodiment of the present invention. FIG. 5 is a perspective exploded view showing a structure of a receptacle type of optical fiber module in accordance with the second embodiment of the present invention. FIG. 6 is a cross-sectional view showing an internal structure of a receptacle type of optical fiber module in accordance with the second embodiment of the present invention. The element, as shown in FIGS. 4-6, indicated by the same reference number as that in FIGS. 1-3 may be referred to the illustration for that in FIGS. 1-3. The pin or contact 1-20, 25 or 26 joining the circuit board 170 may join a mother circuit board (not shown) under the circuit board 170. The pin or contact 1-20, 25 or 26, as shown in FIGS. 4-6, indicated by the same reference number as that in FIGS. 1-3 may perform the same function as that illustrated in FIGS. 1-3 performs. The pins or contacts 1-20, 25 or 26, as shown in FIGS. 4-6, may be arranged in the same fashion as those, as shown in FIGS. 1-3, are arranged.

Referring to FIGS. 4-6, the transmitting and receiving modules 50 perform the same function and have the same internal structure for optically coupling, and for brief description, one of the transmitting and receiving modules 50 is illustrated as below.

Referring to FIGS. 4-6, for a receptacle type of optical fiber module 100, the channels 110 may be pluggable into two parallel receiving holes 113 in the optical fiber module 100 and detachable from the optical fiber module 100. When the channels 110 are plugged into the receiving holes 113, the transmitting and receiving module 50 may include an embedded optical fiber 112 configured to optically couple the optical fiber 111 of the corresponding channel 110, extending from the optical fiber module 100 to the external devices, to the corresponding optical transmitter 21 and receiver 23. In the other words, the embedded optical fiber 112 in the corresponding transmitting and receiving module 50 is embedded in the casing 30 before the corresponding channel 110 is plugged into the corresponding receiving hole 113; after the channels 110 are plugged into the receiving holes 113, the optical fiber 111 of the corresponding channel 110 may be directly optically coupled to the embedded optical fiber 112 so as to be optically coupled to the corresponding optical transmitter 21 and receiver 23.

Referring to FIGS. 4-6, the transmitting and receiving module 50 may include the optical filter 52 in the casing 30 and in optical paths between the embedded optical fiber 112 and the corresponding optical transmitter 21 and between the embedded optical fiber 112 and the corresponding optical receiver 23. Lights with first specific wavelengths from the corresponding optical transmitter 21 may be configured to pass the optical filter 52 to the embedded optical fiber 112. The optical filter 52 may be configured to reflect lights with second specific wavelengths from the embedded optical fiber 112 to the corresponding optical receiver 23.

Referring to FIGS. 4-6, the transmitting and receiving module 50 may include the optical filter 53 in the casing 30 and in an optical path between the optical filter 52 and the corresponding optical receiver 23. Lights with third specific wavelengths, within the second ones, from the optical fiber 52 may be configured to pass the optical filter 53 to the corresponding optical receiver 23.

Referring to FIGS. 4-6, the transmitting and receiving module 50 may include a fixture 54, in the casing 30, configured to fix with the corresponding optical transmitter 21, the corresponding optical receiver 23 and the filters 52 and 53. The corresponding optical transmitter 21 may be at a back side of the fixture 154 and face forward to emit lights to the embedded optical fiber 112 through the optical filter 52. The corresponding optical receiver 23 may be at an upper side of the fixture 54 and face downward to receive lights from the embedded optical fiber 112 via reflection of the optical filter 52. An opening 55 at a front end of the fixture 54 may have the embedded optical fiber 112 pass therethrough to directly optically couple with the optical filter 52.

Referring to FIGS. 4-6, the transmitting and receiving module 50 may include a ferrule 56, i.e. fiber support, shaped like a cylinder configured to receive the embedded optical fiber 112. An internal passageway at a longitudinal axis of the ferrule 56 passes through the ferrule 56 and accommodates the embedded optical fiber 112. The ferrule 56 supports the embedded optical fiber 112 extending in an axial direction 60 and passes through the opening 55. The ferrule 56 has a surface 57 inclined from a bottom edge of the ferrule 56 to an upper edge of the ferrule 56 opposite to the bottom edge of the ferrule 56 with respect to the axial direction 60, wherein an obtuse angle, ranging from 90 degrees to 120 degrees for example, may exist between the inclined surface 57 and the longitudinal axis of the ferrule 56. The embedded optical fiber 112 has a surface 113, at a terminal end of the embedded optical fiber 112, substantially coplanar with the surface 57 of the ferrule 56. Lights passing through the embedded optical fiber 112 may emerge from the surface 113 of the embedded optical fiber 112 to the corresponding optical receiver 23; lights passing from the corresponding optical transmitter 21 may be incident to the surface 113 of the embedded optical fiber 112.

Referring to FIGS. 4-6, the transmitting and receiving module 50 may include a base seat 58 surrounding the periphery of the ferrule 56 and a sleeve 59 surrounding the periphery of the ferrule 56 and having a back end abutting against a step of the base seat 58. A hole in the base seat 58 may extend along a longitudinal axis of the base seat 58 and in the axial direction 60 and accommodate a portion of the sleeve 59, a portion of the ferrule 56 and a portion of the embedded optical fiber 112. The base seat 58 may have an inner wall abutting against an outer wall of the ferrule 56. A hole in the sleeve 59 may extend along a longitudinal axis of the sleeve 59 and in the axial direction 60 and accommodate a portion of the ferrule 56 and a portion of the embedded optical fiber 112. The sleeve 59 may have an inner wall abutting against the outer wall of the ferrule 56.

Referring to FIGS. 4-6, the transmitting and receiving module 50 may include a tube 62 surrounding the periphery of the sleeve 59 and the periphery of the base seat 58 and having a step abutting against a front end of the base seat 58. A hole in the tube 62 may extend along a longitudinal axis of the tube 62 and in the axial direction 60 and accommodate a portion of the sleeve 59, a portion of the base seat 58, a portion of the ferrule 56 and a portion of the embedded optical fiber 112. The tube 62 may have an inner wall abutting against an outer wall of the base seat 58. The transmitting and receiving module 50 may include a ring 63 surrounding the periphery of the base seat 58 and having a back end joining a front end of the fixture 54 by laser welding. A hole in the ring 63 may extend along a longitudinal axis of the ring 63 and in the axial direction 60 and accommodate a portion of the base seat 58, a portion of the ferrule 56 and a portion of the embedded optical fiber 112. The ring 63 may have an inner wall abutting against the outer wall of the base seat 58.

Referring to FIGS. 4-6, the optical fiber module 100 may include a circuit board 170, such as printed circuit board or ceramic circuit board, alternatively arranged at a back side of the optical transmitting and receiving modules 50 and in the casing 30, wherein none of the optical transmitters 21 and receivers 23 may be arranged over the top surface of the circuit board 170. The pins or contacts 1-20, 25 and 26 extending downwards from a bottom surface of the circuit board 170 may pass through holes in the circuit board 170 and joins the circuit board 170. The optical transmitters 21 may be configured to emit optical signals to the embedded optical fibers 112 respectively based on data from the circuit board 170. Further, the circuit board 170 may be configured to transmit data based on optical signals received by the optical receivers 23 from the embedded optical fibers 112 respectively.

Referring to FIGS. 4-6, the optical fiber module 100 may include two flexible circuit films 171 alternatively arranged over the transmitting and receiving modules 50 and the circuit board 170 and in the casing 30 for electrically coupling the circuit board 170 to the optical receivers 23 respectively. The flexible circuit films 171 perform the same function and have the same structure for connection, and for brief description, one of the flexible circuit films 171 is illustrated as below. The flexible circuit film 171 may couple electrical pins 64 at a top side of the corresponding optical receiver 23 to corresponding electric contacts 66 of the circuit board 170 across over the corresponding optical transmitter 21, wherein the electrical contacts 66 are at a top side of the circuit board 170. The corresponding electrical pins 64 may pass through holes in the flexible circuit film 171 and join ring-shaped electrical contacts 77 of the flexible circuit film 171 by tin or a solder, such as a tin-lead alloy. The flexible circuit film 171 may have electrical contacts 174 joining the corresponding electrical contacts 66 of the circuit board 170 by tin or a solder, such as a tin-lead alloy. Accordingly, electronic signals or data streams may be transmitted from the corresponding optical receiver 23 to the circuit board 170 through the flexible circuit film 171.

Referring to FIGS. 4-6, the corresponding electrical pins 51 at the back side of the corresponding optical transmitter 21 may couple to corresponding contacts 79 of the circuit board 170, at top and bottom surfaces thereof, by tin or a solder, such as a tin-lead alloy, so as to electrically and mechanically couple the corresponding optical transmitter 21 to the circuit board 170.

Referring to FIGS. 4-6, the casing 30 may include a pedestal 37 configured to support the transmitting and receiving modules 50 and the circuit board 170 and a cover 38 configured to cover the transmitting and receiving modules 50 and the circuit board 170 and to fix with the pedestal 37. The optical fiber module 100 may include two light pipes 90 configured to be fixed in two respective longitudinal grooves 91 at a bottom surface of the pedestal 37, wherein each of the light pipes 90 may include a plug 92 at an end thereof configured to pass through a corresponding one of openings 93 in the pedestal 37 for optically coupling to a corresponding one of two light emitting diodes (LED) 96 mounted on a bottom surface of the circuit board 170. The lights emitted from the light emitting diodes (LED) 96 may be guided by the light pipes 90 to a front side of the optical fiber module 100 such that a user may see the lights, emitted from the light emitting diodes (LED) 96, from the front side of the optical fiber module 100. Light emitted from the light emitting diodes (LED) 96 may have functions described as below: For example, light emitted from a first one of the light emitting diodes (LED) 96 may indicate whether light is emitted from the first optical transmitter 21 and light is transmitted from the optical fiber 111 of the first channel 110 to the first optical receiver 23. If light is emitted from the first optical transmitter 21 and light is transmitted from the optical fiber 111 of the first channel 110 to the first optical receiver 23, light may be emitted from the first light emitting diode (LED) 96; if either light is not emitted from the first optical transmitter 21 or light is not transmitted from the optical fiber 111 of the first channel 110 to the first optical receiver 23, light may not be emitted from the first light emitting diode (LED) 96.

Also, referring to FIGS. 4-6, the lights emitted from a second one of the light emitting diodes (LED) 96 may indicate whether light is emitted from the second optical transmitter 21 and light is transmitted from the optical fiber 111 of the second channel 110 to the second optical receiver 23. If light is emitted from the second optical transmitter 21 and light is transmitted from the optical fiber 111 of the second channel 110 to the second optical receiver 23, light may be emitted from the second light emitting diode (LED) 96; if either light is not emitted from the second optical transmitter 21 or light is not transmitted from the optical fiber 111 of the second channel 110 to the second optical receiver 23, light may not be emitted from the second light emitting diode (LED) 96. Alternatively, light emitted from the first and second light emitting diodes (LED) 96 may indicate whether a temperature in the optical fiber module 100 is abnormal. Alternatively, light emitted from the first and second light emitting diodes (LED) 96 may indicate whether a voltage applied in the optical fiber module 100 is abnormal.

Referring to FIGS. 4-6, for assembling the optical fiber module 100, after the transmitting and receiving modules 50 are electrically and mechanically coupled to the circuit board 170, the transmitting and receiving modules 50 and the circuit board 170 may be placed on the pedestal 37, the pins and contacts 1-10 passing through a longitudinal hole 31 in the pedestal 27 and the pins and contacts 11-20 passing through another longitudinal hole 32 in the pedestal 27. Next, the optical fiber module 100 may include a fixture 94 with two arc portions 95, at a bottom side thereof, to be pushed onto the tubes 62 of the transmitting and receiving modules 50 respectively, wherein each of the arc portions of the fixture 94 may have a step configured to abut against a step of a corresponding one of the tubes 62. At the same time, the fixture 94 may be secured with the pedestal 37 such that the transmitting and receiving modules 50 and the circuit board 170 may be fixed over the pedestal 37. Next, the cover 38 may be locked with the pedestal 37.

Third Embodiment

Figure 7:
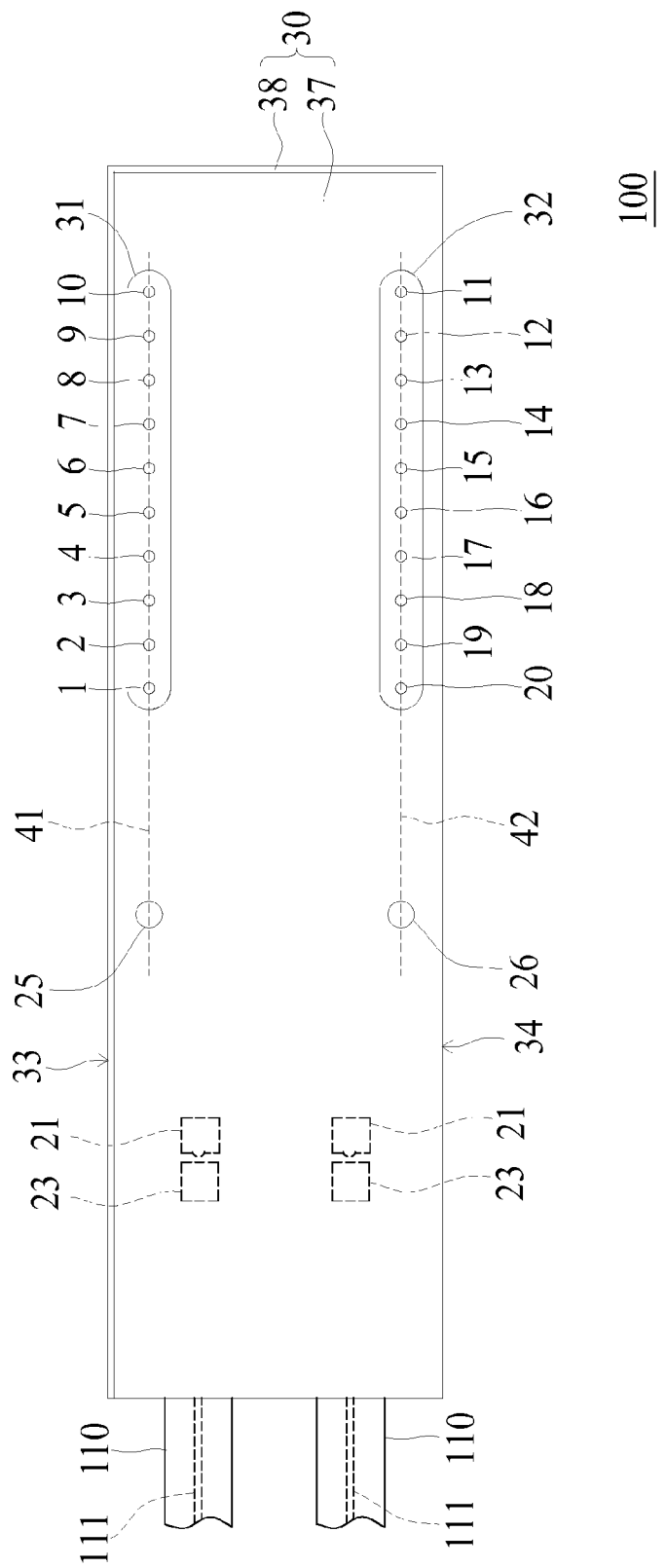
FIG. 7 shows a bottom view of a receptacle type of optical fiber module with dual-channel connection in accordance with a third embodiment of the present invention.
Figure 8:
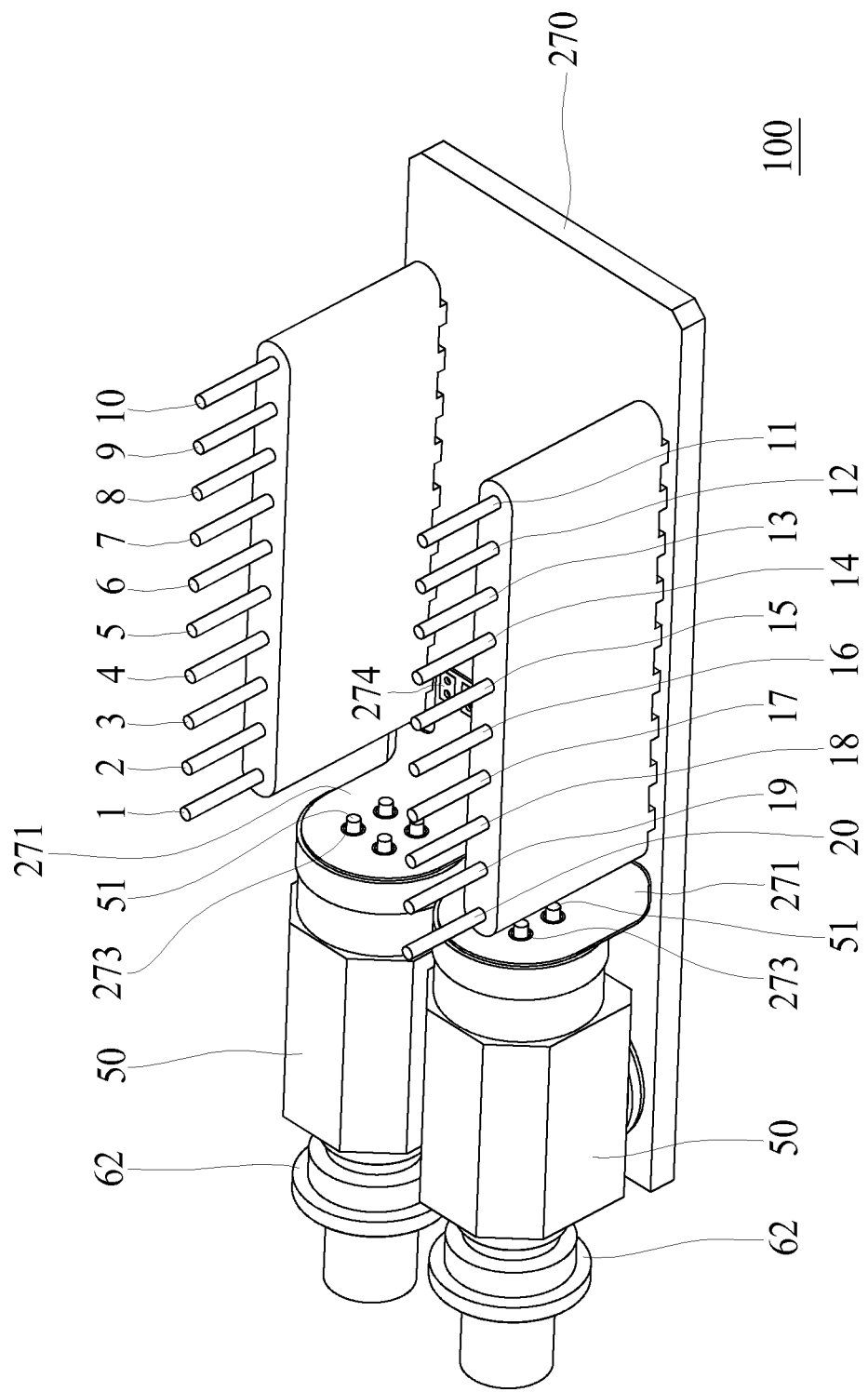
FIG. 8 shows a perspective bottom view of a receptacle type of optical fiber module with dual-channel connection in accordance with the third embodiment of the present invention.
Figure 9:
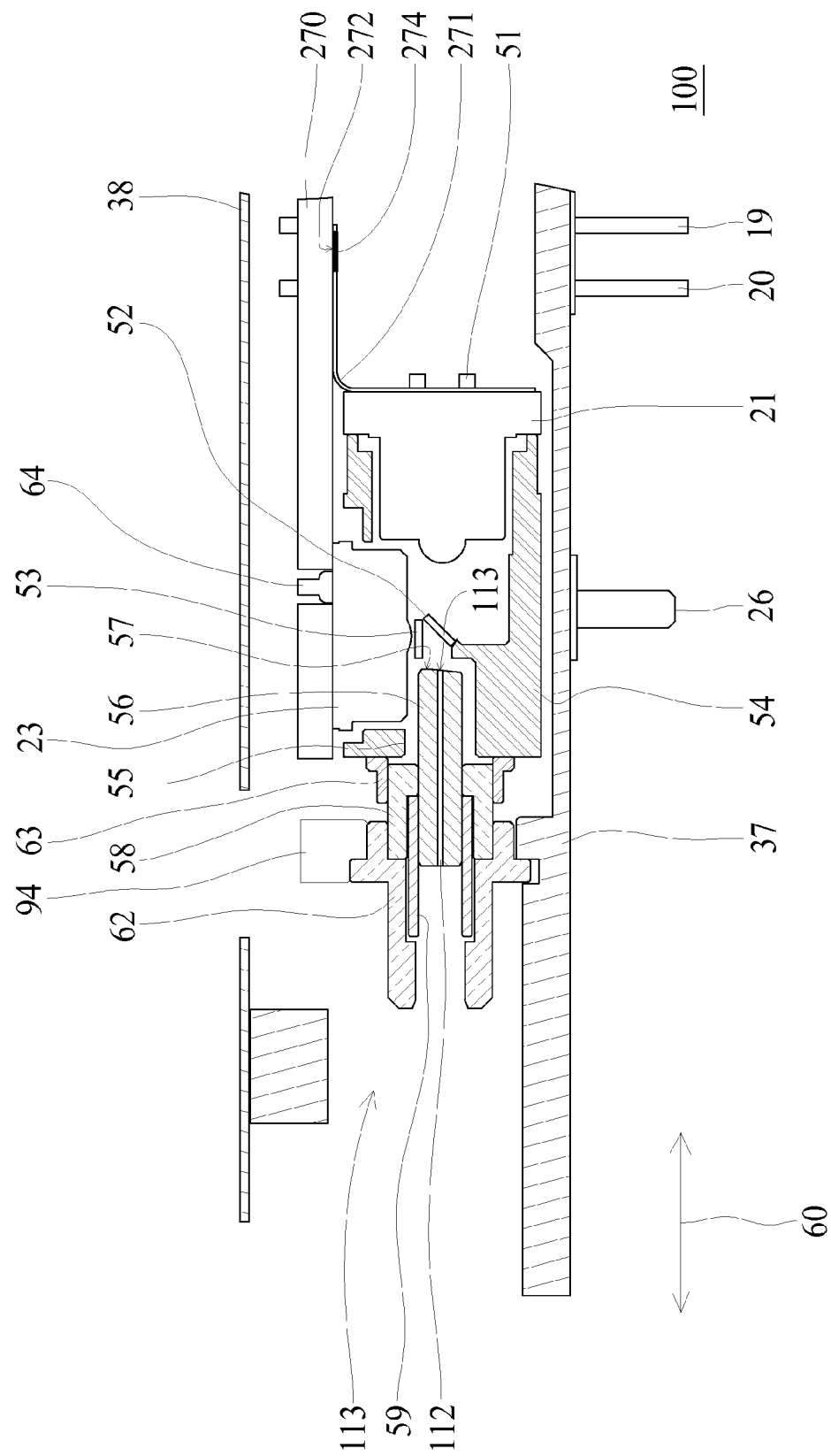
FIG. 9 is a cross-sectional view showing an internal structure of a receptacle type of optical fiber module in accordance with the third embodiment of the present invention.

FIG. 7 shows a bottom view of a receptacle type of optical fiber module with dual-channel connection in accordance with the third embodiment of the present invention. FIG. 8 shows a perspective bottom view of a receptacle type of optical fiber module with dual-channel connection in accordance with the third embodiment of the present invention. FIG. 9 is a cross-sectional view showing an internal structure of a receptacle type of optical fiber module in accordance with the third embodiment of the present invention. The element, as shown in FIGS. 7-9, indicated by the same reference number as that in FIGS. 4-6 may be referred to the illustration for that in FIGS. 4-6. The pin or contact 1-20, 25 or 26 joining a circuit board 270 may join a mother circuit board (not shown) under the circuit board 270. The pin or contact 1-20, 25 or 26, as shown in FIGS. 7-9, indicated by the same reference number as that in FIGS. 1-3 may perform the same function as that illustrated in FIGS. 1-3 performs. The pins or contacts 1-20, 25 or 26, as shown in FIGS. 7-9, may be arranged in the same fashion as those, as shown in FIGS. 1-3, are arranged.

The difference between the second and third embodiments is that the optical fiber module 100 may include a circuit board 270, instead of the circuit board 70, over the optical transmitters 21 and receivers 23 of the transmitting and receiving modules 50, as seen in FIGS. 7-9, and two flexible circuit films 271, instead of the flexible circuit films 71, mechanically and electrically coupling the respective optical transmitters 21 to the circuit board 270. The optical transmitters 21 may be configured to emit optical signals to the embedded optical fibers 112 respectively based on data from the circuit board 270. Further, the circuit board 270 may be configured to transmit data based on optical signals received by the optical receivers 23 from the embedded optical fibers 112 respectively.

Referring to FIGS. 7-9, the transmitting and receiving modules 50 perform the same function and have the same internal structure for optically coupling, and for brief description, one of the transmitting and receiving modules 50 is illustrated as below. The electrical pins 64 at the top side of the corresponding optical receiver 23 may pass through holes in the circuit board 270 and joins the circuit board 270 by tin or a solder, such as a tin-lead alloy, so as to electrically and mechanically couple the corresponding optical receiver 23 to the circuit board 270. The flexible circuit films 271 are under the circuit board 270 for electrically coupling the circuit board 270 to the optical transmitters 21 respectively. The flexible circuit films 271 perform the same function and have the same structure for connection, and for brief description, one of the flexible circuit films 271 is illustrated as below. The flexible circuit film 271 may couple corresponding electrical pins 51, arranged in a vertical plane, at the back side of the corresponding optical transmitter 21 to corresponding electrical contacts 272, arranged in a horizontal plane, of the circuit board 270, wherein the electrical contacts 272 are at a bottom side of the circuit board 270. The corresponding electrical pins 51 may pass through holes in the flexible circuit film 271 and joins ring-shaped electrical contacts 273 of the flexible circuit film 271 by tin or a solder, such as a tin-lead alloy. The flexible circuit film 271 may have electrical contacts 274 joining the corresponding electrical contacts 272 of the circuit board 270 by tin or a solder, such as a tin-lead alloy. Accordingly, electronic signals or data streams may be transmitted from the circuit board 270 to the corresponding optical transmitter 21 through the flexible circuit film 271.

Fourth Embodiment

Figure 10:
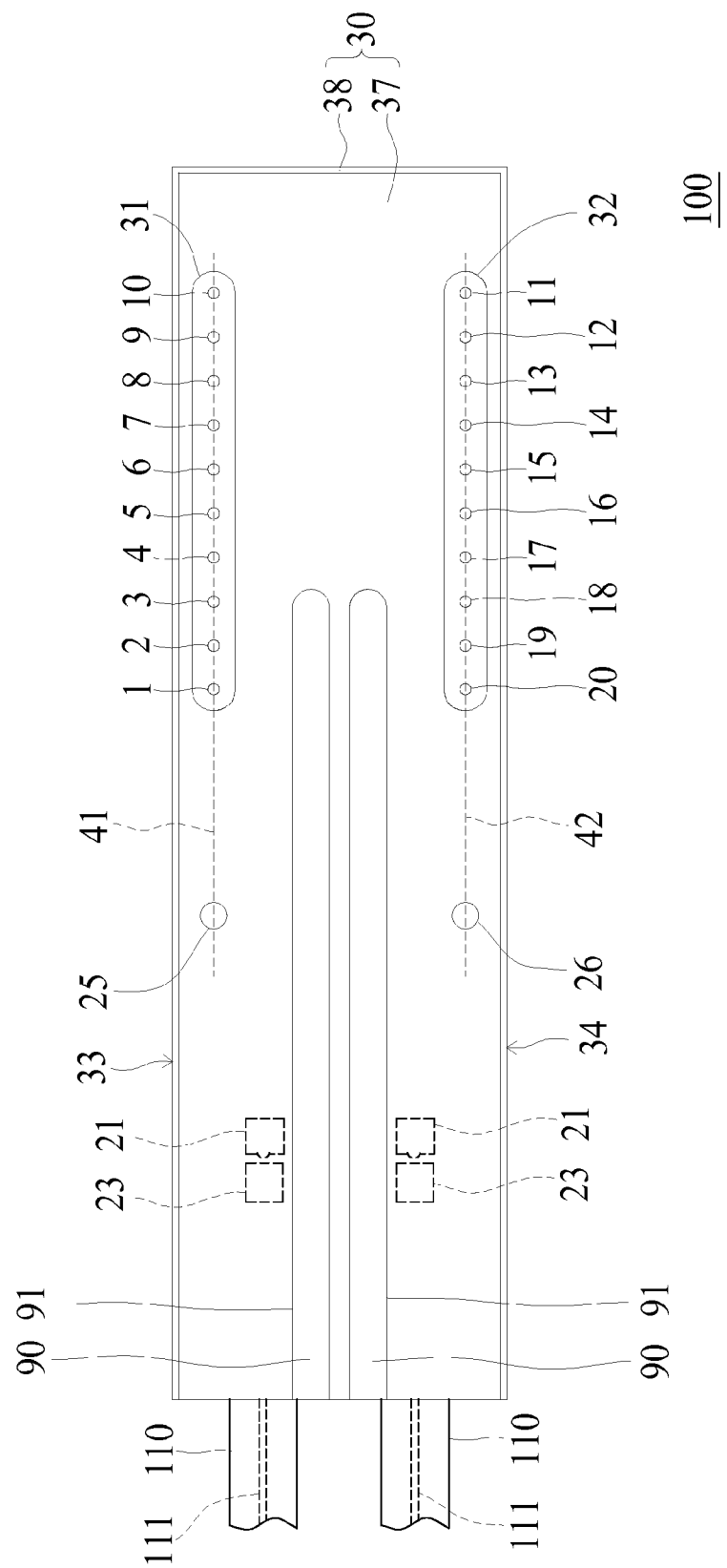
FIG. 10 shows a bottom view of a receptacle type of optical fiber module with dual-channel connection in accordance with a fourth embodiment of the present invention.
Figure 11:
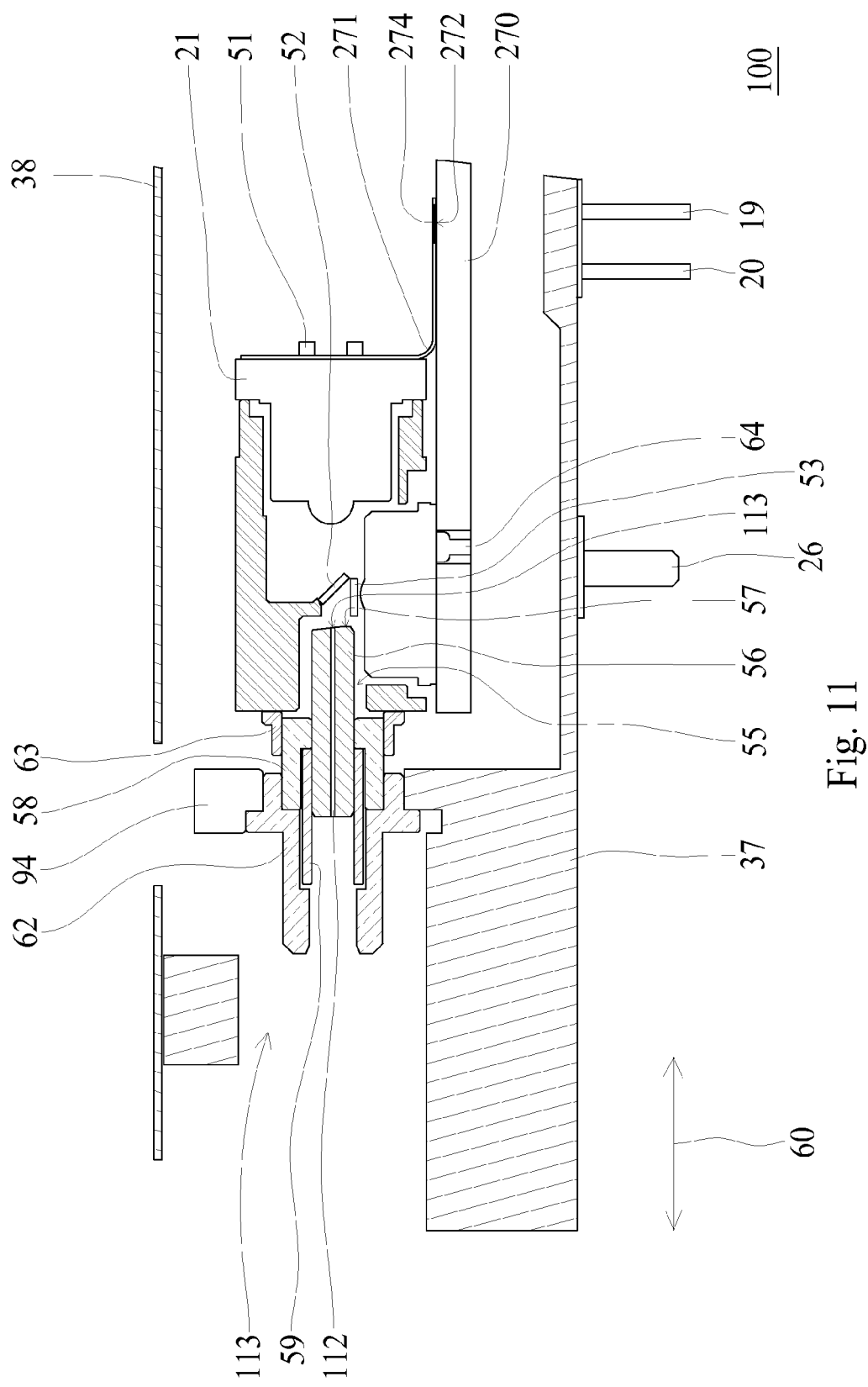
FIG. 11 is a cross-sectional view showing an internal structure of a receptacle type of optical fiber module in accordance with a fourth embodiment of the present invention.

FIG. 10 shows a bottom view of a receptacle type of optical fiber module with dual-channel connection in accordance with a fourth embodiment of the present invention. FIG. 11 is a cross-sectional view showing an internal structure of a receptacle type of optical fiber module in accordance with a fourth embodiment of the present invention. The element, as shown in FIGS. 10 and 11, indicated by the same reference number as that in FIGS. 4-9 may be referred to the illustration for that in FIGS. 4-9. The pin or contact 1-20, 25 or 26 joining the circuit board 270 may join a mother circuit board (not shown) under the circuit board 270. The pin or contact 1-20, 25 or 26, as shown in FIGS. 10 and 11, indicated by the same reference number as that in FIGS. 1-3 may perform the same function as that illustrated in FIGS. 1-3 performs. The pins or contacts 1-20, 25 or 26, as shown in FIGS. 10 and 11, may be arranged in the same fashion as those, as shown in FIGS. 1-3, are arranged.

The difference between the third and fourth embodiments is that the optical receivers 23 may be alternatively arranged at bottom sides of the transmitting and receiving modules 50 and the optical transmitters 21 and receivers 23 and the flexible circuit films 271 may be alternatively arranged over the circuit board 270.

Referring to FIGS. 10 and 11, the transmitting and receiving modules 50 perform the same function and have the same internal structure for optically coupling, and for brief description, one of the transmitting and receiving modules 50 is illustrated as below. The electrical pins 64 at a bottom side of the corresponding optical receiver 23 may pass through holes in the circuit board 270 and joins the circuit board 270 by tin or a solder, such as a tin-lead alloy, so as to electrically and mechanically couple the corresponding optical receiver 23 to the circuit board 270. The flexible circuit films 271 are over the circuit board 270 for electrically coupling the circuit board 270 to the optical transmitters 21 respectively. The flexible circuit films 271 perform the same function and have the same structure for connection, and for brief description, one of the flexible circuit films 271 is illustrated as below. The flexible circuit film 271 may couple corresponding electrical pins 51, arranged in a vertical plane, at the back side of the corresponding optical transmitter 21 to the corresponding electrical contacts 272, arranged in a horizontal plane, of the circuit board 270, wherein the electrical contacts 272 are at a top side of the circuit board 270. The corresponding electrical pins 51 may pass through holes in the flexible circuit film 271 and joins ring-shaped electrical contacts, which may be referred to ones 273 shown in FIG. 8, of the flexible circuit film 271 by tin or a solder, such as a tin-lead alloy. The flexible circuit film 271 may have electrical contacts 274 joining the corresponding electrical contacts 272 of the circuit board 270 by tin or a solder, such as a tin-lead alloy. Accordingly, electronic signals or data streams may be transmitted from the circuit board 270 to the corresponding optical transmitter 21 through the flexible circuit film 271. Light emitting diodes (LED), which may be referred to ones 96 shown in FIG. 5, may be mounted on a bottom surface of the circuit board 270, optically coupling to the plugs, which may be referred to ones 92 shown in FIG. 5, of the light pipes 90 configured to be fixed in the respective longitudinal grooves 91 at the bottom surface of the pedestal 37. A user may see the lights, emitted from the light emitting diodes (LED), from the front side of the optical fiber module 100, and the lights may indicate the information as mentioned in the second embodiment.

Further, referring to FIGS. 10 and 11, the ferrule 56 may be arranged in another way mentioned as below. The surface 57 of the ferrule 56 may be alternatively inclined from an upper edge of the ferrule 56 to a bottom edge of the ferrule 56 opposite to the upper edge of the ferrule 56 with respect to the axial direction 60, wherein an acute angle, ranging from 60 degrees to 90 degrees for example, may exist between the inclined surface 57 and the longitudinal axis of the ferrule 56. Also, the surface 113 of the embedded optical fiber 112 may be substantially coplanar with the surface 57 of the ferrule 56.

Referring to FIGS. 4-11, in accordance with the above receptacle type of optical fiber module 100 as illustrated in the second, third and fourth embodiments, when the channels 110 are plugged into the optical fiber module 100, independent optical signals or data streams may be simultaneously transmitted between the external devices and the optical fiber module 100 through the independent channels 110 independent from each other.

The components, steps, features, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Furthermore, unless stated otherwise, the numerical ranges provided are intended to be inclusive of the stated lower and upper values. Moreover, unless stated otherwise, all material selections and numerical values are representative of preferred embodiments and other ranges and/or materials may be used.

The scope of protection is limited solely by the claims, and such scope is intended and should be interpreted to be as broad as is consistent with the ordinary meaning of the language that is used in the claims when interpreted in light of this specification and the prosecution history that follows, and to encompass all structural and functional equivalents thereof.

What is claimed is:

1. An optical fiber module comprising:
multiple electrical contacts arranged in a horizontal plane and configured for external connection of said optical fiber module;
a first optical fiber;
a first optical transmitter configured to convert a first electronic signal, from a first one of said electrical contacts, into a first optical signal to be transmitted through said first optical fiber;
a second optical fiber configured to transmit optical signals independent from those transmitted by said first optical fiber; and
a second optical transmitter configured to convert a second electronic signal, from a second one of said electrical contacts, into a second optical signal to be transmitted through said second optical fiber, wherein a third one of said electrical contacts first pins is configured to deliver power to said first and second optical transmitters, wherein a fourth one of said electrical contacts is configured to transmit information of controlling whether said first electronic signal transmitted through said first one of said electrical contacts loop back to a fifth one of said electrical contacts.

2. The optical fiber module of claim 1, wherein a sixth one of said electrical contacts is configured to connect to a common ground for said first and second optical transmitters.

3. The optical fiber module of claim 1, wherein a sixth one of said electrical contacts is configured to transmit information of indicating whether a light is emitted from said first optical transmitter.

4. The optical fiber module of claim 1 further comprising a circuit board joining said electrical contacts and a flexible circuit film electrically connecting said first optical transmitter to said circuit board.

5. The optical fiber module of claim 1 further comprising an optical receiver configured to convert a third optical signal from said first optical fiber into a third electronic signal to be transmitted through said fifth one of said electrical contacts.

6. The optical fiber module of claim 1 further comprising an optical receiver configured to convert a third optical signal from said second optical fiber into a third electronic signal to be transmitted through said fifth one of said electrical contacts.

7. The optical fiber module of claim 1, wherein a sixth one of said electrical contacts is configured to transmit analog information generated by an analog indicator of said optical fiber module.

8. The optical fiber module of claim 1, wherein a sixth one of said electrical contacts is configured to transmit information of indicating whether a temperature in said optical fiber module is abnormal.

9. The optical fiber module of claim 1, wherein a sixth one of said electrical contacts is configured to transmit information of indicating whether a voltage applied in said optical fiber module is abnormal.

10. The optical fiber module of claim 1 further comprising a pedestal, a circuit board over said pedestal, wherein said circuit board joins said electrical contacts, a light emitting device on a bottom surface of said circuit board and a light pipe in a groove at a bottom surface of said pedestal, wherein said light pipe has a plug vertically extending through said pedestal to optically couple to said light emitting device.

11. The optical fiber module of claim 1 further comprising a circuit board joining said electrical contacts, wherein said first optical transmitter comprises a first pin extending in parallel with and over a top surface of said circuit board and a second pin extending in parallel with and under said bottom surface of said circuit board, wherein said first pin joins said top surface of said circuit board and said second pin joins said bottom surface of said circuit board.

12. The optical fiber module of claim 1 further comprising a circuit board joining said electrical contacts, wherein said first and second optical transmitters and said circuit board are at the same level, wherein said circuit board has a first side facing a back side of said first optical transmitter and a back side of said second optical transmitter.

13. An optical fiber module comprising:
multiple electrical contacts arranged in a horizontal plane and configured for external connection of said optical fiber module;
a first optical fiber;
a first optical receiver configured to convert a first optical signal, from said first optical fiber, into a first electronic signal to be transmitted through a first one of said electrical contacts;
a second optical fiber configured to transmit optical signals independent from those transmitted by said first optical fiber; and
a second optical receiver configured to convert a second optical signal, from said second optical fiber, into a second electronic signal to be transmitted through a second one of said electrical contacts, wherein a third one of said electrical contacts is configured to deliver power to said first and second optical receivers, wherein a fourth one of said electrical contacts is configured to transmit information of controlling whether a third electronic signal transmitted through a fifth one of said electrical contacts loop back to said first one of said electrical contacts.

14. The optical fiber module of claim 13, wherein a sixth one of said electrical contacts is configured to connect to a common ground for said first and second optical receivers.

15. The optical fiber module of claim 13, wherein a sixth one of said electrical contacts is configured to transmit information of indicating whether a light is transmitted from said first optical fiber to said first optical receiver.

16. The optical fiber module of claim 13 further comprising a first circuit board joining said electrical contacts, wherein said first and second optical receivers are over said first circuit board, wherein said electrical contacts connect said first circuit board to a second circuit board under said first circuit board.

17. The optical fiber module of claim 13, wherein a sixth one of said pins is configured to transmit analog information generated by an analog indicator of said optical fiber module.

18. The optical fiber module of claim 13 further comprising a pedestal, a circuit board over said pedestal, wherein said circuit board joins said electrical contacts, a light emitting device on a bottom surface of said circuit board and a light pipe in a groove at a bottom surface of said pedestal, wherein said light pipe has a plug vertically extending through said pedestal to optically couple to said light emitting device.

19. The optical fiber module of claim 13 further comprising a circuit board joining said electrical contacts and a flexible circuit film electrically connecting said first optical receiver to said circuit board.

20. The optical fiber module of claim 13 further comprising a circuit board joining said electrical contacts and a light emitting device on said circuit board, wherein said light emitting device is configured to indicate whether light is transmitted from said first optical fiber to said first optical receiver.

* * * * *